US009662782B2

(12) United States Patent
Nam et al.

(10) Patent No.: US 9,662,782 B2
(45) Date of Patent: May 30, 2017

(54) MOBILE ROBOT FOR DETECTING AND REPAIRING DAMAGES OF HULL

(71) Applicant: Mokpo National Maritime University Industry-Academic Cooperation Foundation, Jeollanam-do (KR)

(72) Inventors: Teak-kun Nam, Jeollanam-do (KR); Jin-man Kim, Jeollanam-do (KR)

(73) Assignee: Mokpo National Maritime University Industry-Academic Cooperation Foundation, Jeollanam-do (KR)

( * ) Notice: Subject to any disclaimer, the term of this patent is extended or adjusted under 35 U.S.C. 154(b) by 126 days.

(21) Appl. No.: 14/670,278

(22) Filed: Mar. 26, 2015

(65) Prior Publication Data
US 2015/0273696 A1 Oct. 1, 2015

(30) Foreign Application Priority Data

Mar. 26, 2014 (KR) ........................ 10-2014-0035321

(51) Int. Cl.
| B25J 5/00 | (2006.01) |
| B25J 19/00 | (2006.01) |
| B25J 19/02 | (2006.01) |
| G05D 1/02 | (2006.01) |

(52) U.S. Cl.
CPC ............. B25J 5/007 (2013.01); B25J 19/005 (2013.01); B25J 19/023 (2013.01); G05D 1/0272 (2013.01); *G05B 2219/40003* (2013.01); *G05B 2219/40033* (2013.01); *Y10S 901/01* (2013.01);
(Continued)

(58) Field of Classification Search
None
See application file for complete search history.

(56) References Cited

U.S. PATENT DOCUMENTS 3,777,834 A * 12/1973 Hiraoka ............ B23K 37/0264
114/222
3,988,922 A * 11/1976 Clark ..................... G01M 3/24
367/104

(Continued)

FOREIGN PATENT DOCUMENTS

| KR | 10-0533664 | 11/2005 |
| KR | 10-0776062 | 11/2007 |

*Primary Examiner* — Khoi Tran
*Assistant Examiner* — Ryan Rink
(74) *Attorney, Agent, or Firm* — Intellectual Property Law Group LLP

(57) ABSTRACT

Disclosed is a mobile robot for detecting and repairing damages of a hull, including: a mobile robot unit which includes at least one frame to which motor-driven drive wheels are installed, frame connectors which flexibly connect the frames with each other, and at least one robot electromagnet and adsorption module mounted on each of the frames, and is configured to be attached to the hull through the robot electromagnet so as to move or stop on a surface of the hull by the drive wheels; a stage unit which includes a rechargeable battery mounted therein to supply power to the mobile robot unit, and a docking module provided to dock with or separate from the mobile robot unit; and a connection line configured to be wound or unwound while receiving tension controlled by the stage unit, and electrically connected between the mobile robot unit and the stage unit.

8 Claims, 8 Drawing Sheets

(52) U.S. Cl.
CPC ............ *Y10S 901/41* (2013.01); *Y10S 901/44* (2013.01); *Y10S 901/47* (2013.01)

(56) References Cited

U.S. PATENT DOCUMENTS

| | | | |
|---|---|---|---|
| 8,534,395 B2* | 9/2013 | Niederberger | B08B 1/00 180/8.1 |
| 2005/0004708 A1* | 1/2005 | Goldenberg | G08C 17/00 700/245 |
| 2008/0188982 A1* | 8/2008 | Imus | B62D 55/265 700/245 |
| 2012/0266803 A1* | 10/2012 | Zediker | B63G 8/001 114/337 |
| 2013/0263770 A1* | 10/2013 | Andersen | B63B 59/08 114/330 |
| 2014/0144715 A1* | 5/2014 | Albin | B62D 55/265 180/9.1 |
| 2015/0097084 A1* | 4/2015 | Szabo | B64G 1/1078 244/171.1 |
| 2016/0001829 A1* | 1/2016 | Albin | B62D 55/265 305/116 |

* cited by examiner

A-A CROSS-SECTION

B-B CROSS-SECTION

MOBILE ROBOT FOR DETECTING AND REPAIRING DAMAGES OF HULL

CROSS-REFERENCE TO RELATED APPLICATIONS

This application claims priority to Korean Patent Application No. 10-2014-0035321, filed on Mar. 26, 2014 in the Korean Intellectual Property Office, the entire disclosure of which is incorporated herein by reference.

BACKGROUND OF THE INVENTION

1. Field of the Invention

The present invention relates to a mobile robot for detecting and repairing damages of a hull, and more specifically, to a mobile robot for detecting and repairing damaged or defective portions of a hull which can be used to repair the hull such as in a ship, offshore structure, plant, or the like in case of an accident.

2. Description of the Related Art

Generally, robots are used to manufacture and repair a bull in a shipbuilding field, and specifically, can be effectively used at a region difficult to access, or a place which may cause accidents at high altitude locations.

For example, in a conventional working method targeting a ship hull for detecting breakages or damages generated on the ship hull and repairing the same, men perform work while being hung on a side of the hull by using ropes, ladders, tower wagons, or the like. Thereby, work efficiency may be reduced, and may cause personal damage due to an accident.

In particular, mobile robots used for detecting and repairing damages of the hull in the art include a power supply and driving unit integrally formed with each other, and thereby energy efficiency may be decreased due to an increase in weights.

Further, there are robots capable of moving along the side of a hull disclosed in patent documents as a background of the invention. However, since these robots are used only in high altitude works such as cleaning, painting, inspection, or the like, there is a limitation on applications for performing detection and repairing damages generated on the side of the hull by accidents, etc., and carrying out works such as rescue and relief, etc. on behalf of rescue workers in case of an accident.

In addition, since the conventional robots used in the shipbuilding field have a main controller or an auxiliary controller located on an outside of a hull away from the robots, power may not be stably supplied to the robot side due to a limitation as described below. That is, when connecting cables such as communication lines or power lines between the main controller and the robots, movability of the robot is significantly limited due to a limited length of the cables or large weight thereof.

Further, since the conventional robots used in the shipbuilding field may move with specific equipment mounted thereon, they can execute only specified missions corresponding to the specific equipment, and thereby availability of the robot may be reduced.

Furthermore, the conventional robots used in the shipbuilding field employ a manual control system controlled by the main controller or the auxiliary controller, it is difficult to automatically search a destination and move thereto.

Furthermore, when the conventional robots used in the shipbuilding field are provided with wheels, they are designed so as to move on only relatively flat and smooth surfaces, and in order to fix the body of robot on a curved surface such as a typical ship hull by using electromagnets, it is not possible to deform the body of the robot so as to face and contact the electromagnets corresponding to the curved surface. Thereby, the adhesive force of electromagnets to the curved surface may be decreased.

For example, Korean Patent Registration No. 10-0533664 (Registered on Nov. 29, 2005) discloses a mobile robot capable of moving on a surface while being adhered thereto, and Korean Patent Registration No. 10-0776062 (Registered on Nov. 6, 2007) discloses a robot for high altitude works. However, these patents still entail the above-described problems.

SUMMARY OF THE INVENTION

In consideration of the above-mentioned circumstances, it is an object of the present invention to provide a mobile robot for detecting and repairing damages of a hull which includes a mobile robot unit and a stage unit to be docked with or separated from each other, such that the mobile robot may freely move on a side of hull with largely reduced weight, and perform detection and repair damaged or defective portions generated on the side of a hull by an accident of ships or the like.

Another object of the present invention is to provide a mobile robot for detecting and repairing damages of a hull which includes a stage unit configured to be attached to the hull and serve as a power supply, and a mobile robot unit configured to be separated from the stage unit and serve as a driving unit, wherein power is transmitted from the stage to the mobile robot unit through a connection line serving as a cable, such that energy efficiency may be increased due to a reduced weight of the mobile robot, and thereby, it is possible to work for a longer time than the conventional integrated mobile robot, and specifically, limitations in weight and capacity may be decreased due to the stage unit serving as the power supply with an attachable platform structure.

In order to accomplish the above objects, according to one aspect of the present invention, there is provided a mobile robot for detecting and repairing damages of a hull, including: a mobile robot unit which includes at least one frame to which motor-driven drive wheels are rotatably installed, frame connectors which flexibly connect the frames with each other, and at least one robot electromagnet and adsorption module mounted on each of the frames, and is configured to be attached to the hull through the robot electromagnet so as to move or stop on a surface of the hull by the drive wheels; a stage unit which includes a rechargeable battery mounted therein to supply power to the mobile robot unit, and a docking module provided thereon to dock with or separate from the mobile robot unit; and a connection line which is configured to be wound or unwound while receiving tension controlled by the stage unit, and electrically connected between the mobile robot unit and the stage unit.

Preferably, the mobile robot unit includes: a robot body which has the frames and the frame connectors; a wheel drive device which is installed at any one of the frames to supply power to the drive wheels disposed on a rear axle of the drive wheels; a rear shaft which is connected to the wheel drive device to be rotated therewith; a power transmitting mechanism which is installed on another frame of the frames to transmit the power of the wheel drive device to the drive wheels disposed on a front axle of the drive wheels; a front shaft which is connected to the rear shaft to transmit the power of the wheel drive device to the power transmitting mechanism; and a spike ball joint which is installed on the frame connector and coupled between the rear shaft and the front shaft, so as to transmit the power of the wheel drive devices transmitted through the rear shaft to the front shaft.

Preferably, the mobile robot unit is provided with a pair of the wheel drive devices, the rear shafts, the power transmitting mechanisms, the front shafts, and the spike ball joints at the robot body.

Preferably, the mobile robot unit further includes an imaging device which is mounted in the robot body so as to obtain images on a surface of the hull for detecting damaged or defective portions thereof.

Preferably, the mobile robot unit further includes a repair tool which is mounted on the robot body so as to repair the defective or damaged portions of the hull.

Preferably, the mobile robot further includes: a robot controller which is mounted in the robot body and connected to the imaging device and the repair tool; and a stage controller which is mounted in the stage unit to calculate a distance and position between the mobile robot unit and the stage unit based on a signal detected by a robot position sensor connected to the robot controller and variations in a length of the connection line, and calculate a tension to be applied to the connection line.

Preferably, the stage unit includes: a stage body which has a docking module on a top thereof so as to be coupled to fixing protrusions of the mobile robot unit, and the rechargeable battery mounted therein; at least one stage electromagnet which is arranged on one side of the stage body so as to face the hull; a sealable external power connection terminal which is installed on the other side of the stage body, and connected to the stage controller; and at least one linear motor which is coupled to the stage body, and is controlled by the stage controller so as to closely contact a permanent magnet provided on an end of an operation arm thereof to the hull or separate therefrom.

Preferably, the stage unit includes: a drum which is rotatably installed on the stage body to have the connection line wound thereon; a drum motor installed on the stage body to forwardly or reversely rotate the drum so as to wind or unwind the connection line; a power transmitting unit which is installed between the drum motor and the drum to transmit power of the drum motor to the drum; an encoder which is installed on one end of a drum shaft of the drum to measure the number of revolutions of the drum; and a line tensioner which is installed on a drum frame for supporting the drum, so as to apply a tension to the connection line.

The mobile robot for detecting and repairing damages of a hull according to one embodiment of the present invention includes the mobile robot unit provided with the robot electrode magnets, adsorption modules and drive wheels, and the stage unit to be docked with or separated from the mobile robot unit and to be attached to and detached from the hull, such that it is possible to freely move on or be fixed to the deck, sides and bottom of the hull, and perform the detection and repair of the damages or faults on behalf of workers.

In addition, according to the present invention, since the mobile robot unit having the repair tool mounted thereon and the stage unit having the power rechargeable battery mounted therein are separately included, it is possible to largely decrease the weight of the mobile robot unit, while the weight of the equipment (for example, the repair tool, welder, hooks, or rope hooking device, etc.) to be mounted on the robot is relatively increased.

That is, in the mobile robot of the present invention, the mobile robot unit receives power from the separate type stage unit through the connection line, such that energy efficiency may be increased due to a reduced weight of the mobile robot, and thereby, it is possible to work for a longer time than the conventional integrated mobile robot, and specifically, limitations in weight and capacity may be decreased due to the stage unit serving as the power supply with an attachable platform structure.

Further, according to the present invention, the robot body of the mobile robot unit includes the plurality of drive wheels, the frames which can be divided into a plurality of sections and have the drive wheels installed thereto, the frame connectors of flexible material which connect the frames with each other, such that the mobile robot may move along the surface of the hull made of steel material with curves or unevenness using the magnetic fields of the robot electromagnets mounted on each frame and the drive wheels, and thereby exhibiting a stable moving performance on the curved surface of the hull.

Furthermore, the mobile robot unit according to the present invention may be stably fixed to the hull using the adsorption module mounted on each frame of the robot body during repairing the hull.

Furthermore, the mobile robot unit according to the present invention has at least one robot electromagnet disposed on the bottoms of four frames, and is configured to determine the magnetic force applied to the bottom of each frame, wherein the magnetic force of each robot electromagnet is calculated and determined using a mean value of the pressure detected by a pressure sensor of the tube type drive wheel, such that mobility of the robot may be improved and work time required for detecting or repairing the damaged or defective portions, etc. may be shortened, compared to the robot using the adsorption module or the robot which can be adhered and move by only a predetermined magnitude of magnetic force.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
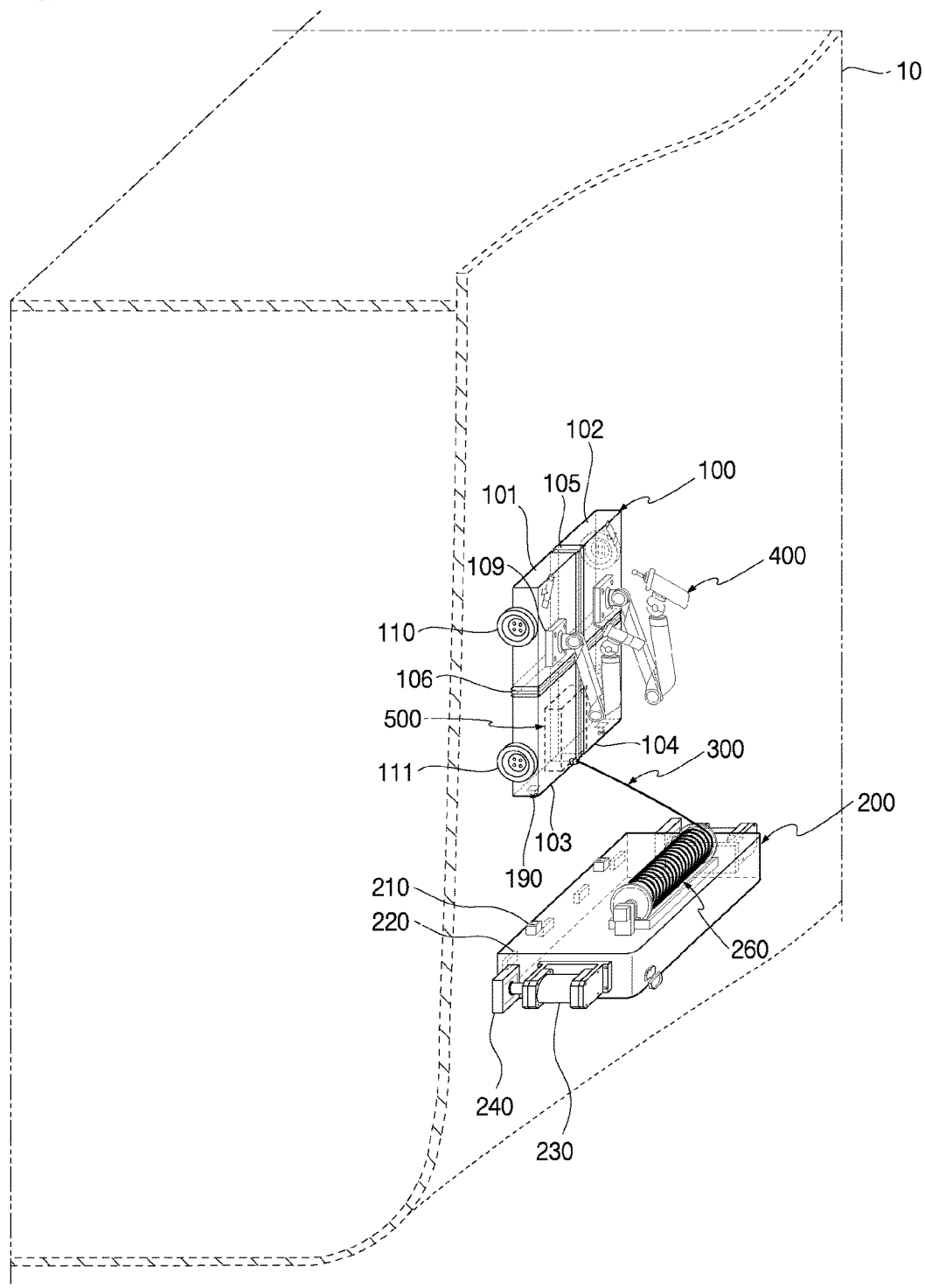
FIG. 1 is a perspective view of a mobile robot for detecting and repairing damages of a hull according to one embodiment of the present invention.

Hereinafter, the present invention will be described with reference to the accompanying drawings in detail. Referring to the drawings, wherein like reference characters designate like or corresponding parts throughout the several views. In the embodiments of the present invention, the publicly known functions and configurations that are judged to be able to make the purport of the present invention unnecessarily obscure will not be described.

FIG. 1 is a perspective view of a mobile robot for detecting and repairing damages of a hull according to one embodiment of the present invention.

Referring to FIG. 1, the mobile robot according to the present embodiment may include a mobile robot unit 100, a stage unit 200, and a connection line 300.

The mobile robot unit 100 serves to detect damaged or defective portions of a hull, and when necessary repair of the hull, repair the damaged or defective portions by using a repair tool 400 mounted on the mobile robot unit 100. Herein, the repair tool 400 may be a robotic module such as a welder, a grinder, power tongs or the like. Since the robotic module of the repair tool 400 may be attached to and detached from a mount 109 of the mobile robot unit 100, it is not necessary to limited to a specific robotic module.

In addition, the repair tool 400 may be remotely controlled by a wireless joystick provided on a hull 10 to perform manual repair works, or may be operated by a repair algorithm previously set therein to perform automatic repair works.

Furthermore, the mobile robot unit 100 has auxiliary equipment 500 such as hooks, rope hooking device, or the like used in works such as rescue and relief, etc. in case of an accident.

The mobile robot unit 100 which includes at least one frame 101, 102, 103 or 104 to which four motor-driven drive wheels 110 and 111 are rotatably installed, frame connectors 105 and 106 which flexibly connect the frames 101, 102, 103 and 104 with each other, and at least one robot electromagnet and adsorption module mounted on each of the first to fourth frames 101, 102, 103 and 104, and may be configured to be attached to the hull 10 through the robot electromagnet so as to move or stop on a surface of the hull 10 by the drive wheels 110 and 111. That is, the mobile robot unit 100 may move on a side, deck, bottom, etc. of the hull 10 while being attached thereon, and receive power form the stage unit 200 through the connection line 300.

The drive wheels 110 and 111 may be made of a flexible material such as urethane, rubber, or the like, and have a superior frictional or grip force compared to the metallic wheel having magnetic force.

In addition, the drive wheels 110 and 111 may be a tube type wheel and have a pressure sensor 112 which can applied to a control method of a tire pressure monitoring system (TPMS) generally used in the art, respectively.

The stage unit 200 includes a rechargeable battery mounted therein to supply power to the mobile robot unit 100, and docking modules 210 provided thereon to dock with or separate from the mobile robot unit 100. Herein, the rechargeable battery may be formed of a lithium-ion battery including a plurality of cells, and may be replaced by other portable power supplies.

The stage unit 200 is a type of robot control instrumentation controller device for controlling operations of the stage unit 200 itself and the mobile robot unit 100, and serves as a reference point used by attaching the hull 10 and a power supply, as well as may be communicated with the mobile robot unit 100 to move in conjunction therewith.

Therefore, the stage unit 200 may easily supply power to the mobile robot unit 100, and may easily set a moving path and confirm a position of the mobile robot unit 100. As compared to the conventional mobile robot having the main controller disposed on the outside of the hull 10, the connection line 300 may have a short length relative to the prior art, and thereby it is possible to reduce the weight of the connection line 300 compared thereto.

In addition, the stage unit 200 includes at least one stage electromagnet 220 provided thereon so as to be attached to or detached from the hull 10. Further, the stage unit 200 includes linear motors 230 provided at both sides thereof, and permanent magnets 240 mounted on operation arms of the linear motors 230, such that the stage unit 200 may be fixed to the hull 10 using the permanent magnets 240 so as to reduce power consumption of the stage electromagnets 220. The linear motors 230 may include voice coil motors (VCMs) or voice coil actuators (VCAs) known in the art. In this case, since the stage unit 200 is fixed to the hull 10 by the magnetic force of the permanent magnets 240, it is possible to reduce the power consumption of stage electromagnets 220.

Further, the linear motors 230 may be provided with an inner shock detecting sensor module (not illustrated). Herein, the inner shock detecting sensor module may serve to detect vibration generated during attaching the permanent magnets 240 to an object (for example, hull, etc.), stop the operation of the linear motors 230 depending on the detected signal, and send an attach complete signal of the permanent magnets 240 to a stage controller. The stage controller of the stage unit 200 may cut the power to the stage electromagnets 220 based on the attach complete signal. In addition, the stage controller of the stage unit 200 may include an electronic circuit to control the supply and cut of the power to the docking modules 210, so as to control an operation for locking or releasing fixing protrusions 190 formed on the mobile robot unit 100 at portions corresponding to the docking modules 210 of the stage unit 200.

The connection line 300 may be configured to be wound or unwound while receiving tension controlled by the stage unit 200, and electrically connected between the mobile robot unit 100 and the stage unit 200. In this regard, the connection line 300 may be stored with being wound on a drum of a tension winch 260 mounted on the stage unit 200 or unwound by rotating the drum.

As described above, since the mobile robot unit 100 and the stage unit 200 have the configuration capable of docking with or separating from each other through the docking modules 210 and the fixing protrusions 190, it is possible to largely reduce the weight of the mobile robot unit 100 compared to the conventional mobile robot.

Further, the mobile robot unit 100 may autonomously move with being separated from the stage unit 200.

Figure 2:
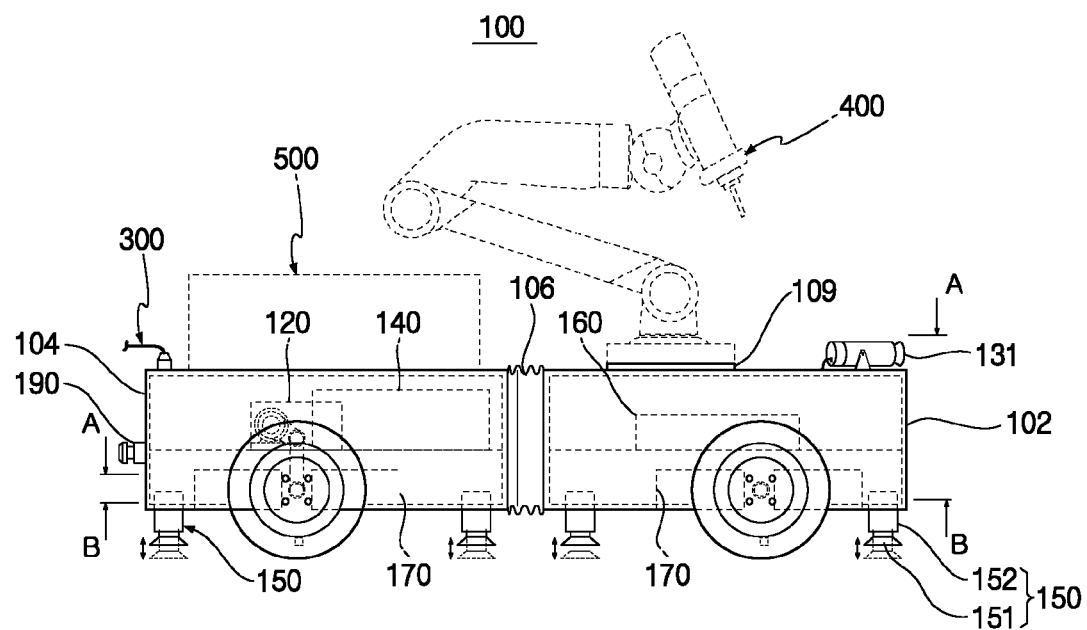
FIG. 2 is a side view of a mobile robot unit illustrated in FIG. 1.
Figure 3:
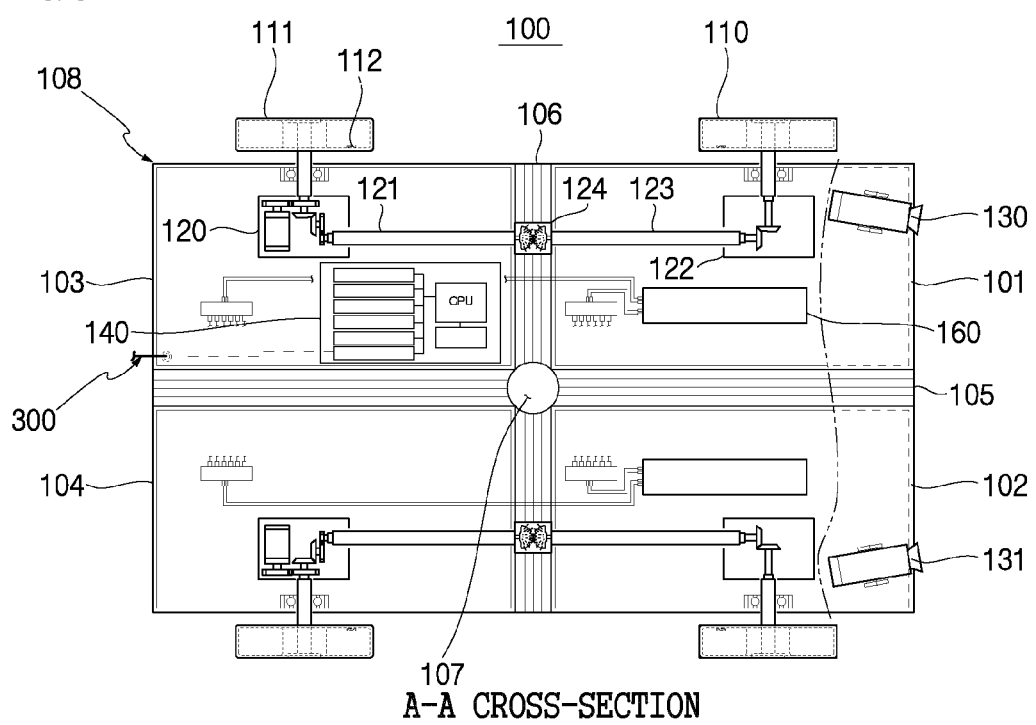
FIG. 3 is a cross-sectional view taken on line A-A of FIG. 2.
Figure 4:
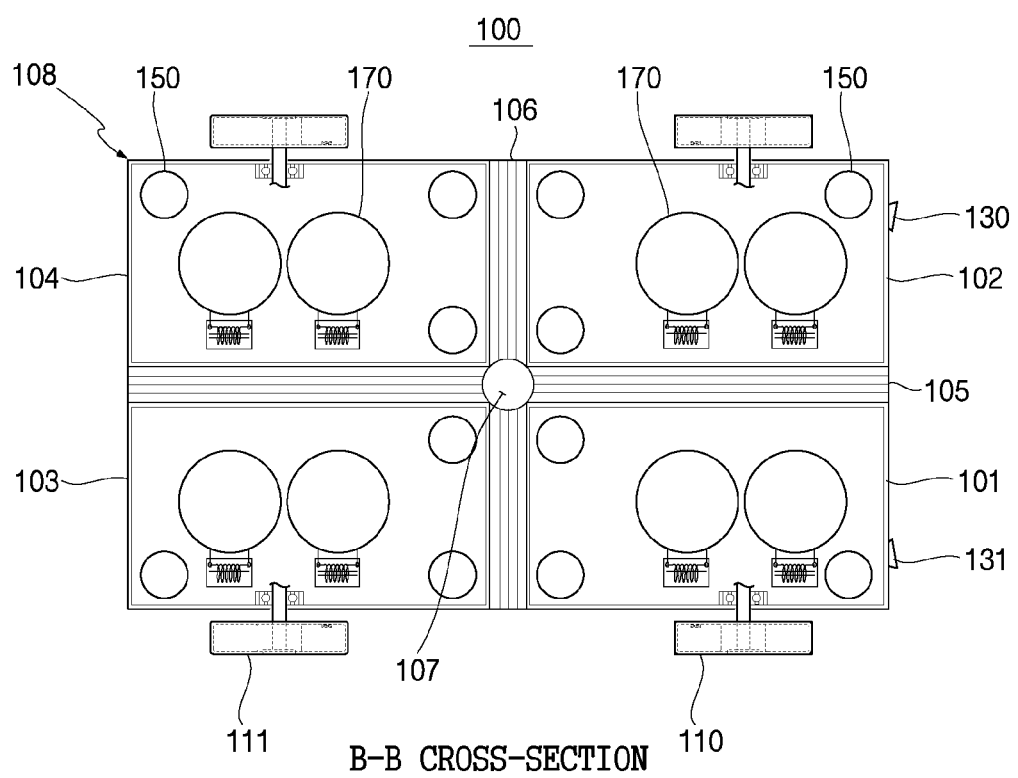
FIG. 4 is a cross-sectional view taken on line B-B of FIG. 2.

FIG. 2 is a side view of a mobile robot unit illustrated in FIG. 1, FIG. 3 is a cross-sectional view taken on line A-A of FIG. 2, and FIG. 4 is a cross-sectional view taken on line B-B of FIG. 2.

Referring to FIGS. 2 and 3, the mobile robot unit 100 has a robot body 108 divided into four sections and configured to independently move from each other. For this, the robot body 108 includes the frames 101, 102, 103 and 104 which are formed in a hollow box shape or formed of a cover and a hollow body to be separated from each other, and has mounting spaces therein, and the frame connectors 105 and 106 which connect the respective frames 101, 102, 103 and 104 in longitudinal direction or lateral direction thereof.

In particular, the frame connectors 105 and 106 also serve to abut the frames 101, 102, 103 and 104 to curved surface of the hull corresponding thereto, so as to uniformly generate a magnetic flux on the curved surface.

Meanwhile, the frame connectors 105 and 106 have a hole-shaped hollow space 107 formed at an intersection point therebetween for increasing the degree of freedom that the frames 101, 102, 103 and 104 can be twisted or bent.

The mobile robot unit 100 is mounted on any one (for example, the third frame 103) of the frames 101, 102, 103 and 104. The mobile robot unit 100 includes wheel drive devices 120 which supply power to the drive wheels 111 disposed on a rear axle of the drive wheels 110 and 111. Herein, the wheel drive device 120 includes gears rotated by a drive motor provided inside of the third frames 103, and serves to connect the gears with the rear axle to drive the drive wheels 111 disposed thereon.

Further, the mobile robot unit 100 includes a rear shaft 121 connected to the wheel drive devices 120 to be rotated therewith, and a power transmitting mechanism 122 which is installed on the first frame 101 located at a front of the third frame 103 for transmitting the power of the wheel drive devices 120 to the drive wheels 110 disposed on a front axle of the drive wheels 110 and 111.

Further, the mobile robot unit 100 includes a front shaft 123 whose one end is connected to the rear shaft 121 and the other end is connected to the power transmitting mechanism 122 so as to transmit the power of the wheel drive devices 120 to the power transmitting mechanism 122. Therefore, the rear shaft 121 and the front shaft 123 mean as power transmitting rotation shaft members in this closure.

The mobile robot unit 100 includes a spike ball joint 124 which is installed on the frame connector 106 and coupled between the rear shaft 121 and the front shaft 123, so as to transmit the power of the wheel drive devices 120 transmitted through the rear shaft 121 to the power transmitting mechanism 122 through the front shaft 123.

Herein, the spike ball joint 124 includes semi-spherical or spherical extension blocks whose one ends are oppositely disposed on left and right sides of the spike ball joint 124 based on a center line, and the other ends are fixed to end portions of the rear shaft 121 and the front shaft 123, and a plurality of spikes which radially protrude on the spherical surfaces of the extension blocks, and a joint housing formed on the frame connector 106 in which the opposite extension blocks are rotatably coupled with each other through the spikes of fine protrusions, so as to connect the rear shaft 121 and the front shaft 123 within a predetermined range in vertical and horizontal directions.

More specifically, when the mobile robot unit 100 moves on the curved surface such as the hull, since the drive wheels 110 and 111 may be located at different levels from each other, the frame connector 106 may be deformed in vertical and horizontal directions. As a result, each frame 101 and 103 may be independently moved to entirely become a twisted state so as to correspond to the curved surface.

However, in the present embodiment, even in this twisted state, since the spike ball joint 124 may simultaneously rotate with the spikes of the extension blocks being coupled with each other as described above, the power of the wheel drive devices 120 is transmitted to the power transmitting mechanism 122 through the rear and front shafts 121 and 123, and the spike ball joint 124.

Preferably, the mobile robot unit 100 is provided with a pair of the wheel drive devices 120, the rear shafts 121, the power transmitting mechanisms 122, the front shafts 123, and the spike ball joints 124 at the robot body 108 as illustrated in FIG. 3.

In addition, the mobile robot unit 100 further includes imaging devices 130 and 131 mounted on the robot body 108 to obtain images on the surface of the hull for detecting damaged or defective portions thereof.

The imaging devices 130 and 131 may include a digital camera, a stereo camera, charge coupled device (CCD), general video imaging device, imaging device, or the like. The imaging devices 130 and 131 are connected to a robot controller 140, and more specifically, electrically coupled to an image processor of the robot controller 140 to be controlled.

The imaging devices 130 and 131 may be installed to the mobile robot unit 100 through a rotatable or tiltable mount. Rotating or tilting control of the imaging devices 130 and 131 may be performed by a robot control unit of the robot controller 140.

For example, the imaging devices 130 and 131 may include two front cameras inclined toward a progressing direction of the robot body 108, so as to increase accuracy of image quality and distance with an object to be imaged. In addition, the imaging devices 130 and 131 may function to detect a moving path or surroundings of the mobile robot unit 100, and allow the mobile robot unit 100 to autonomously perform missions.

The robot controller 140 controls the imaging devices 130 and 131 to take images of the damaged or defective portions on the hull during moving the mobile robot unit 100, and the taken image data are transmitted to the robot controller of the mobile robot unit 100. The image processor may be configured so as to perform the autonomous driving of the mobile robot unit 100 through the imaging devices 130 and 131, a laser distance measuring device, ultrasonic distance measuring device, and robot autonomous driving algorithms, which are not illustrated in the drawings, in conjunction with the robot controller of the mobile robot unit 100.

The robot controller of the mobile robot unit 100 may analyze the image data taken by the imaging devices 130 and 131, such that the robot controller of the mobile robot unit 100 may check the damaged or defective region depending on the analysis result, and then send notice to a worker by an alarm signal through the communication unit. Herein, the communication unit may include a communication modem circuit capable of performing wired communication and wireless communication.

In addition, the mobile robot unit 100 also includes the repair tool 400 which is connected to the robot controller 140 and is mounted on the robot body 108 so as to repair the damaged regions of the hull.

The robot controller 140 is mounted in the robot body 108, and as illustrated in FIG. 3, includes the robot control unit which is connected to the drive motor of the wheel drive device 120, and to an air pump 160 which generates positive pressure or negative pressure to be supplied to the adsorption modules 150, further, as illustrated in FIG. 4, is connected to adsorption actuators 152 for lifting toe adsorption plates 151 of the adsorption module 150, and connected to the robot electromagnets 170. Herein, the adsorption plates 151 may be an adsorption means which is made of a flexible material and has an empty space and holes to have the negative pressure applied to a center thereof, and an adsorption surface on an edge thereof. In addition, the negative pressure may mean an adsorption force between the adsorption plates 151 and the surface of the hull. The air pump 160 is configured so as to suck air in the space between the adsorption plates 151 and the surface of the hull, and discharge it to an outside of the air pump 160.

The mobile robot unit 100 may further include a robot power switch (not illustrated) exposed to the outside of the robot body 108 and connected to the robot controller 140.

The air pump 160 is supplied with power through the connection line 300 and the robot controller 140.

The air pump 160 may be connected to the adsorption modules 150 illustrated in FIG. 4 to provide or receive air of negative pressure or positive pressure through a pressure distributor and a tube line. In addition, the air pump 160 may be a pump using a voice coil motors (VCMs) type linear motor. Herein, the linear motor may be linear DC motors.

The robot controller 140 includes the robot control unit including a general robot controlling CPU, memories, and the like. The robot control unit controls the operation of the components connected thereto, that is, the drive motor, the air pump 160, the adsorption actuators 152, and the robot electromagnets 170 according to the control algorithm previously programmed therein. Herein, the adsorption actuators 152 may be formed using voice coil motors (VCMs) or voice coil actuators (VCAs) known in the art.

Further, the tube type drive wheels 110 and 111 are respectively provided with pressure sensors 112. Each pressure sensor 112 is connected to a sensor signal collector of the robot controller 140. Pressure detected by the respective pressure sensors 112 is transmitted to the robot controller through the sensor signal collector. Herein, the robot controller calculates a mean value of the received pressure, and calculates and determines the magnetic force of the electromagnet robots 170 through the algorithms for controlling the operation of the robot electromagnets 170, to form a magnetic field of the robot electromagnets 170 corresponding to the determined value.

Further, the robot control unit may also function to control the repair tool 400 through the control line.

In addition, the robot controller 140 may further have a robot position sensor operated in conjunction with the robot control unit and the communication unit. Herein, the robot position sensor may be any one of an infrared sensor, acoustic sensor, geomagnetic sensor, GPS sensor for detecting a relative position and calculating the relative distance of the mobile robot unit 100 based on the stage unit.

Referring to FIG. 4, at least one robot electromagnet 170 may be installed for each frame 101, 102, 103 or 104 to individually form the magnetic field, and exert a stable grip force by the magnetic force, even when the mobile robot unit 100 moves on the curved surface of the hull.

Further, each of drive wheels 110 or 111 is installed on each frame 101, 102, 103 or 104, and changes in the level of the frame 101, 102, 103 and 104 in the vertical direction and changes in the level of drive wheels 110 and 111 in the vertical direction may simultaneously occur, such that the adaptability to the curved surface of the hull may be very excellent.

Concurrently referring to FIGS. 2 and 4, the adsorption actuators 152 of the adsorption modules 150 lift the adsorption plates 151 according to the control of the robot control unit of the robot controller 140. Accordingly, the adsorption plates 151 are spaced apart from the curved surface or the surface of the hull during moving the mobile robot part 100.

In addition, when the mobile robot unit 100 stops during moving, before beginning the repair, the adsorption actuators 152 descend the adsorption plates 151 according to the control of the robot control unit of the robot controller 140. As a result, the adsorption plates 151 are adsorbed on the surface of the hull. At the same time, the robot control unit operates the air pump 160 so as to generate a negative pressure, thereby sucking air between the adsorption plates 151 and the surface of the hull. As a result, the adsorption plates 151 may be fixed to the surface of the hull by the negative pressure, and a supporting force required for the repair tool 400 to perform the repair work may be obtained.

Moreover, when moving the mobile robot unit 100 again after completing the repair work using the repair tool 400, the robot control unit operates the air pump 160 so as to generate a positive pressure, thereby supplying air between the adsorption plates 151 and the surface of the hull. As a result, the adsorption plates 151 become to a state capable of detaching from the surface of the hull by the positive pressure. Then, the adsorption actuators 152 lift the adsorption plates 151 according to the control of the robot control unit. The connection line 300 has the power supply line and the communication line.

Figure 5:
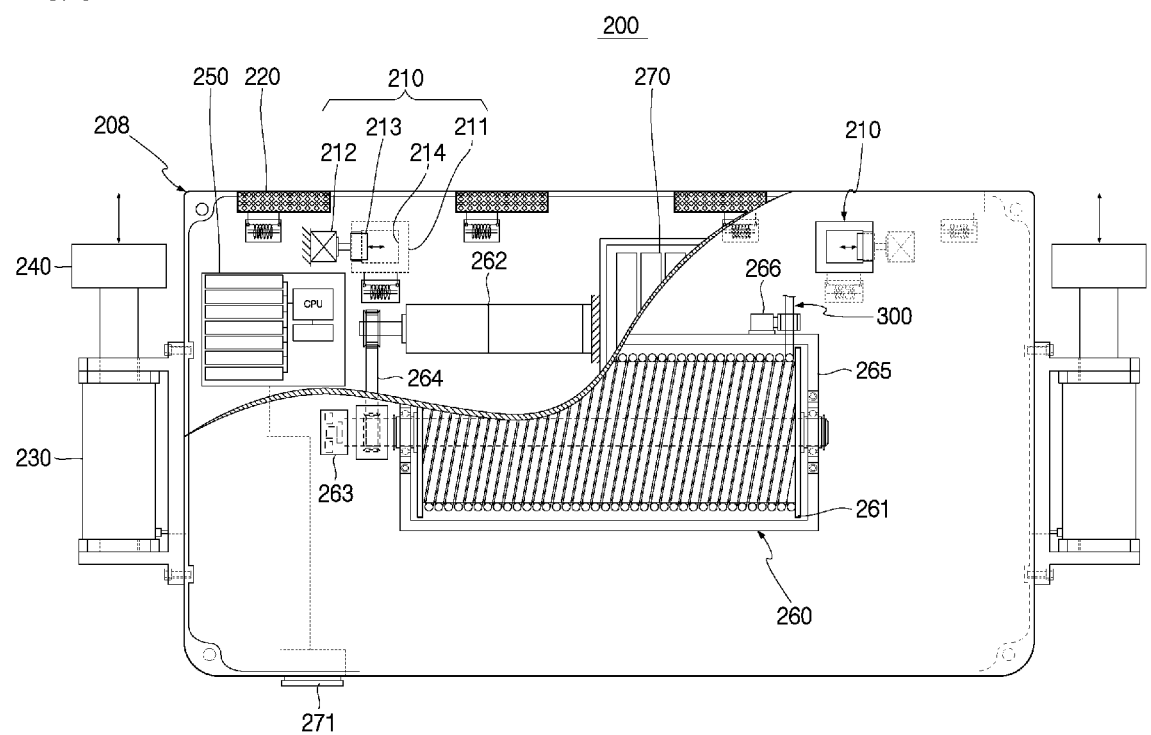
FIG. 5 is a partially cut away plan view of an upper plate of a stage unit illustrated in FIG. 1.

FIG. 5 is a partially cut away plan view of an upper plate of the stage unit illustrated in FIG. 1.

Referring to FIG. 5, the stage unit 200 includes a stage controller 250 which calculates the distance and position between the mobile robot unit 100 and the stage unit 200 based on the signal detected by the robot position sensor connected to the robot controller 140 and variations in the length of the connection line 300 as described above with reference to FIG. 3, and calculates a tension to be applied to the connection line 300.

The stage unit 200 may further have a stage power switch (not illustrated) exposed to the outside of a stage body 208 and connected to the stage controller 250.

The stage controller 250 includes a stage control unit formed of a stage control circuit including a CPU, memories, and the like. The stage control unit may function to control the operation of docking electromagnets 211 of the docking modules 210, locking devices 212, the stage electromagnets 220, the linear motors 230, and a drum motor 262 of the tension winch 260 according to the control algorithm previously programmed therein In addition, the drum motor 262 may include a motor unit and a motor reduction gearbox.

The stage control unit serves to respectively control the operation of the docking electromagnets 211, the locking devices 212, the stage electromagnets 220, the linear motors 230, and the drum motor 262, which are connected thereto. The locking device 212 and the linear motors 230 may also be formed using the voice coil motors (VCMs) or voice coil actuators (VCAs) known in the art.

The stage controller 250 has the communication unit that can communicate with the communication unit of the robot controller as described above. In addition, the stage controller 250 may include a position calculator which calculates variations in the length of the connection line 300 which is unwound or wound on a drum 261 by using an input signal received from an encoder 263 for measuring the number of revolutions of the drum 261, and detects the relative position and calculates the relative distance of the mobile robot unit 100 by using an input signal received from the robot position sensor of the robot controller.

In addition, the stage controller 250 is provided with a stage position sensor corresponding to any one of the GPS sensor, geomagnetic sensor, and acceleration sensor.

The above-described position calculator of the stage controller 250 acquires a distance between the stage unit 200 and the mobile robot unit 100 depending on the variations in the length of the connection line 300, based on the position in which the stage unit 200 is attached, and calculates a relative angle of the robot position sensor of the robot controller based on the state position sensor of the stage controller 250, such that the relative position of the mobile robot unit 100 based on the stage unit 200 may be determined.

Further, the stage controller 250 may include a charging unit for charging a rechargeable battery 270 with an external power received through a sealable external power connection terminal 271, and a power supply unit for supplying the power of the rechargeable battery 270 to the mobile robot unit 100 through the connection line 300. Herein, the charging unit may be a circuit for converting AC power into DC power and charging the rechargeable battery 270 with the external power.

The stage unit 200 includes the docking modules 210 as illustrated in FIG. 5, so as to be coupled to the fixing protrusions 190 of the mobile robot unit 100 illustrated in FIG. 2. Herein, a pair of docking modules 210 is provided on the upper plate of the stage body 208, or the docking modules 210 are provided by as many as the number of fixing projections 190 at positions to be docked corresponding to the fixing protrusions 190.

Further, the docking module 210 includes the docking electromagnets 211 having insertion holes 214 into which the fixing protrusions 190 of the mobile robot unit 100 are inserted, and the locking devices 212 for operating locking protrusions 213 coupled to the side of the docking electromagnets 211 so as be reciprocated.

The robot control unit of the robot controller 140 illustrated in FIG. 2 controls the operation of the mobile robot unit 100 so that the mobile robot unit 100 comes close to the stage unit 200. Further, the robot control unit of the robot controller 140 more precisely controls the operation of the mobile robot unit 100 so that the fixing protrusions 190 come close to an upside of the insertion holes 214 of the docking electromagnets 211.

Thus, the stage control unit of the stage controller 250 activates the docking electromagnets 211 of the docking modules 210 so as to maintain the docking between the mobile robot unit 100 and the stage unit 200. The fixing protrusions 190 are pulled to the docking electromagnets 211 by the magnetic force applied thereto. As a result, the fixing protrusions 190 are inserted into the insertion holes 214 of the docking electromagnets 211.

Then, the stage control unit of the stage controller 250 controls the locking device 212, and as a result, the end portions of the locking protrusions 213 are inserted into the grooves formed in the side of the fixing protrusions 190.

Further, in order to reduce the power loss, the stage control unit of the stage controller 250 cuts off or stops the power supplied to the docking electromagnets 211, so as to deactivate the docking electromagnets 211, and complete the docking between the mobile robot unit 100 and the stage unit 200.

In this case, since the mobile robot unit 100 and the stage unit 200 are mechanically fixed to each other, the power consumption of the docking electromagnets 211 may be reduced.

Further, in order to separate the mobile robot unit 100 and the 211 stage unit 200 from each other, the stage controller 250 separates the end portions of the locking protrusions 213 from the grooves of the fixing protrusions 190 by the locking devices 212. In this case, the mobile robot unit 100 may become a separable state from the stage unit 200.

Further, the stage body 208 is provided with a rechargeable battery 270 mounted therein.

Furthermore, the stage unit 200 includes at least one stage electromagnet 220 arranged on one side of the stage body 208 so as to face the hull.

In addition, the stage unit 200 is provided with the sealable external power connection terminal 271 which is installed on the other side of the stage body 208, and connected to the stage controller 250.

Further, the stage unit 200 includes at least one linear motor 230 which is coupled to the stage body 208, and is controlled by the stage controller 250 so as to closely contact the permanent magnets 240 provided on the ends of the operation arms to the hull or separate therefrom.

Herein, the linear motors 230 are installed on the bracket fixed to both sides of the stage body 208, but it is not limited thereto. For example, when the coupling bracket is moved to the upper plate of the stage body 208 and fixed thereto, the linear motors 230 may be located on the upper plate of the stage body.

This stage unit 200 includes the tension winch 260. Herein, the tension winch 260 serves to supply or return by winding or unwinding the connection line 300 while controlling the tension thereof.

The tension winch 260 includes the drum 261 rotatably installed on the stage body 208, and the drum motor 262 installed on the stage body 208 for forwardly or reversely rotating the drum 261 so as to wind or unwind the connection line 300.

In addition, the tension winch 260 includes a power transmitting unit 264 installed between the drum motor 262 and the drum 261, and the encoder 263 installed on one end of a drum shaft of the drum 261 for measuring the number of revolutions of the drum 261. Herein, the power transmitting unit 264 may be formed of pulleys, and belts, or a plurality of power transmitting gears.

In addition, the tension winch 260 includes a line tensioner 266 installed on a drum frame 265 for supporting the drum 261, so as to apply the tension to the connection line 300.

Herein, the line tensioner 266 may be a general cable tensioning device which is configured to control the level of the frictional force applied to the connection line 300, or control the drum motor 262 for controlling the number of the forward or reverse revolutions of the drum 261, so as to uniformly maintain the tension of the connection line 300.

Hereinafter, an operation relation of the mobile robot for detecting and repairing damages of a hull according to the present embodiment will be described with reference to FIGS. 6 to 8.

Figure 6:
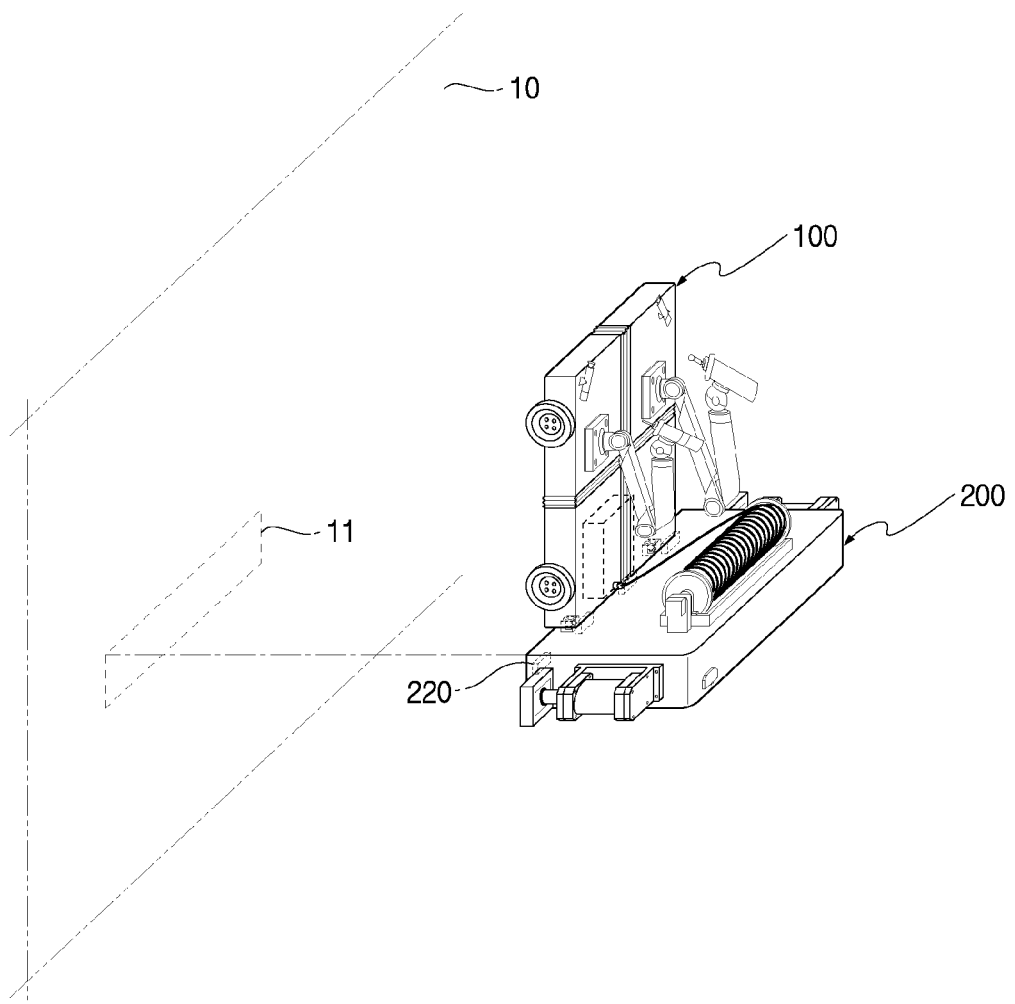
FIGS. 6 to 8 are perspectives for describing an operation relation of the mobile robot for detecting and repairing damages of a hull illustrated in FIG. 1.
Figure 7:
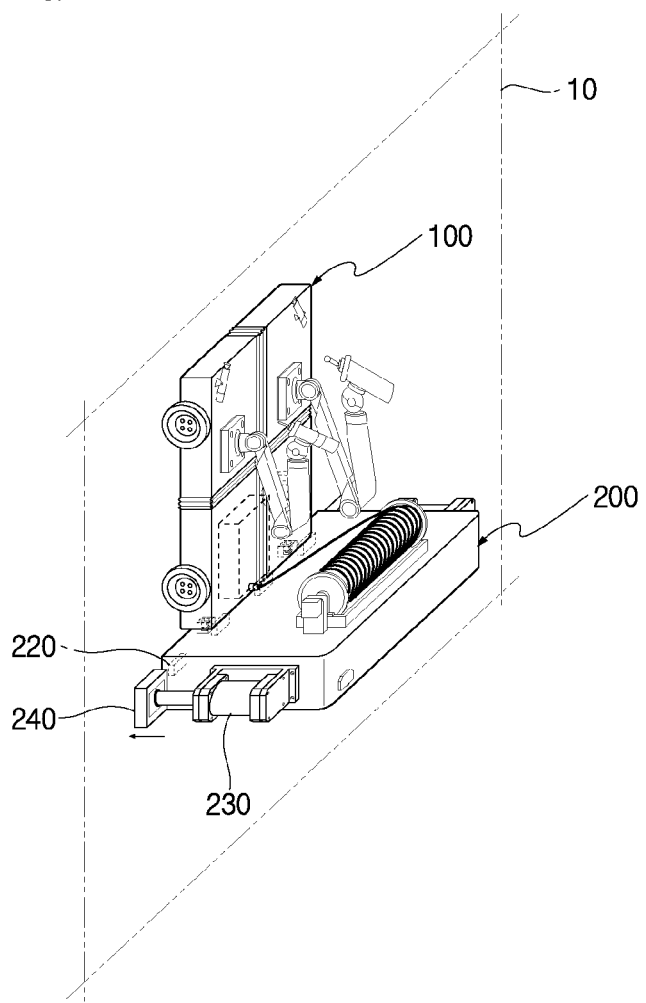
Figure 8:
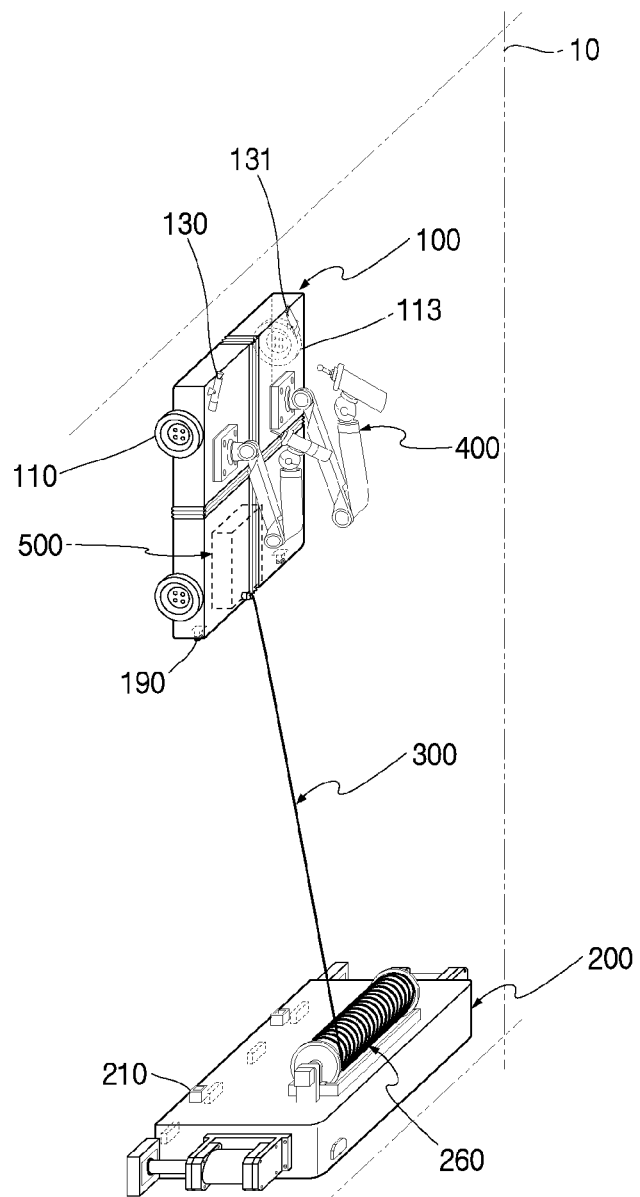

FIGS. 6 to 8 are perspectives for describing the operation relation of the mobile robot for detecting and repairing damages of a hull illustrated in FIG. 1.

Referring to FIG. 6, a hull 10 is a marine vessel construction, which may be a structure having damaged or defective portions at locations difficult to access by a person.

The mobile robot unit 100 and the stage unit 200 are carried to a position of the hull 100 which is predicted to have damaged or defective portions and is capable of allowing maximum access of the portions by a worker.

When the power of the mobile robot unit 100 and the stage unit 200 are turned on by the worker, the mobile robot unit 100 becomes in a ready state for operation. At the same time, the stage unit 200 is becomes in the ready state for operation, and the stage electromagnets 220 are activated to generate a magnetic force.

Then, the stage unit 200 is attached to a fixed position 11 of the hull 10 through the magnetic force of the activated stage electromagnets 220 of the stage unit 200.

Referring to FIG. 7, the stage controller of the stage unit 200 controls the pair of linear motors 230 to move forward the operating arms thereof, and attach the respective permanent magnets 240 mounted on the operating arms to the hull 10. Then, the stage controller cuts off the power supplied to the stage electromagnets 220 to reduce power consumption, and as a result, the stage unit 200 may be fixed to the hull 10 by the magnetic force of the permanent magnets 240.

Referring to FIG. 8, the stage controller of the stage unit 200 controls the locking device of the docking module 210 to separate locking protrusions formed on the locking device of the docking module 210 from the grooved formed in the fixing protrusions 190 of the mobile robot unit 100, so that the fixing protrusions 190 and the docking module 210 are disengaged from each other.

In this case, the mobile robot unit 100 becomes in a state capable of starting from the stage unit 200.

Then, the stage unit 200 communicates with the mobile robot unit 100 to transmit information on the above-described release state to the robot controller of the mobile robot unit 100.

When the mobile robot unit 100 is ready to operate, the mobile robot unit 100 may be in a state of being attached to the surface of the hull 10 through the magnetic force of the robot electromagnets 170 of the mobile robot unit 100.

In addition, the robot controller of the mobile robot unit 100 supplies power to the drive motor of the mobile robot unit 100 to drive the drive wheels 110 of the mobile robot unit 100, so that the mobile robot unit 100 leaves from the stage unit 200 to move on the surface of the hull 10.

At the same time, the robot controller of the mobile robot unit 100 controls the operation of the drum motor of the tension winch 260 so that the connection line 300 is unwound from the drum of the tension winch 260 corresponding to a moving ratio of the mobile robot unit 100. In addition, the connection line 300 may become in a tensioned state while maintaining the tension in a predetermined range by the tension winch 260.

Further, power and communication signals necessary for the operation of the mobile robot unit 100 are transmitted from the stage unit 200 to the mobile robot unit 100 through the connection line 300.

In addition, when the robot controller of the mobile robot unit 100 rotates the right drive wheel 113 while stopping the left drive wheel 110 of the mobile robot unit 100, the mobile robot unit 100 may turn in the left direction.

Conversely, when the robot controller of the mobile robot unit 100 stops the right drive wheel 113 thereof while rotating the left drive wheel 110, the mobile robot unit 100 may turn in the right direction.

By this, the mobile robot unit 100 is capable of changing the direction of movement during driving.

In addition, since the mobile robot unit 100 is provided with the plurality of frames, and the frames are connected to each other by the frame connectors of flexible material, when the mobile robot unit 100 moves on the curved surface of the hull 10, it is possible to independently change the position or height level of the frames based on the frame connectors respectively corresponding to the curved surface, or to be in a state of being flexibly bent. At this time, the robot electromagnet of each frame of the mobile robot unit 100 faces the curved surface of the hull 10 with being close thereto corresponding to the curved surface. As a result, the magnetic force of the robot electromagnets may be evenly applied to each frame of the mobile robot unit 100 even on the curved surface or uneven surface region of the hull 10.

Further, the robot controller of the mobile robot unit 100 operates the imaging devices 130 and 131 in conjunction with the image processor in the operation ready state. During moving or stopping the mobile robot unit 100, the imaging devices 130 and 131 take images on the surface of the hull 10, and analyze taken image data to detect the defective or damaged portions of the hull. When the defective or damaged portions are detected, the robot controller of the mobile robot unit 100 transmits an alarm signal to the worker through the communication unit.

Then, the mobile robot unit 100 may be securely fixed to the hull 10 through the adsorption module 150.

Further, the worker may perform manual repair work by operating the wireless joystick to control the repair tool 400 of the mobile robot unit 100. Of course, when the detected defective or damaged portion is a portion capable of being automatically repaired, the worker may perform automatic repair work using the repair tool 400 of the mobile robot unit 100 while monitoring a monitor (not illustrated) wirelessly connected to the imaging devices 130 and 131.

On the other hand, when using the mobile robot unit 100 for the purpose of life-saving, the mobile robot unit 100 moves near a specific position of the hull 10 difficult to access by the worker by using the auxiliary equipment 500 while pulling a life-saving rope or transporting a life-saving tool.

Next, the mobile robot unit 100 may be securely fixed to the hull 10 through the adsorption module 150.

In this way, since the mobile robot unit 100 may be a fixed point of the life-saving rope, or a messenger capable of transmitting the life-saving tool to a person in danger, the rescue worker may rescue the person in danger through the life-saving rope and life-saving tool transported by the mobile robot unit 100.

As described above, in the present embodiment, it is possible to prevent serious damage and casualties by using the mobile robot unit 100 which can directly work instead of a worker at sections dangerous to access by the worker. In particular, the mobile robot unit 100 may efficiently move by each frame of the mobile robot unit 100 which can be changed depending on the curved surface of the hull 10 while receiving a stable magnetic force applied thereto, and may be stably fixed at a position stopped by the adsorption module 150.

While the present invention has been described with reference to the preferred embodiments, it will be understood by those skilled in the related art that various modifications and variations may be made therein without departing from the scope of the present invention as defined by the appended claims.

What is claimed is:

1. A mobile robot for detecting and repairing damages of a hull, comprising:
   a mobile robot unit which includes at least two frames to which motor-driven drive wheels are rotatably installed on each of the frames, frame connectors which flexibly connect the frames with each other, and at least one robot electromagnet and one adsorption module mounted on each of the frames, and is configured to be attached to the hull through the robot electromagnet so as to move or stop on a surface of the hull by the drive wheels;
   a stage unit which includes a rechargeable battery mounted therein to supply power to the mobile robot unit, and at least one docking module provided thereon to dock with or separate from the mobile robot unit; and
   a connection line which is configured to be wound or unwound while receiving tension controlled by the stage unit, and electrically connected between the mobile robot unit and the stage unit.

2. The mobile robot according to claim 1, wherein the mobile robot unit comprises:

a robot body which has the frames and the frame connectors;

a wheel drive device which is installed at any one of the frames to supply power to at least one drive wheel disposed on a rear axle;

a rear shaft which is connected to the wheel drive device to be rotated therewith;

a power transmitting mechanism which is installed on another frame of the frames to transmit the power of the wheel drive device to at least one drive wheel disposed on a front axle;

a front shaft which is connected to the rear shaft to transmit the power of the wheel drive device to the power transmitting mechanism; and a spike ball joint which is installed on the frame connector and coupled between the rear shaft and the front shaft, so as to transmit the power of the wheel drive devices transmitted through the rear shaft to the front shaft.

3. The mobile robot according to claim 2, wherein the mobile robot unit is provided with a pair of the wheel drive devices, the rear shafts, the power transmitting mechanisms, the front shafts, and the spike ball joints at the robot body.

4. The mobile robot according to claim 2, wherein the mobile robot unit further comprises an imaging device which is mounted in the robot body so as to obtain images on a surface of the hull for detecting damaged or defective portions thereof.

5. The mobile robot according to claim 4, wherein the mobile robot unit further comprises a repair tool which is mounted on the robot body so as to repair the defective or damaged portions of the hull.

6. The mobile robot according to claim 5, further comprising:

a robot controller which is mounted in the robot body and connected to the imaging device and the repair tool; and a stage controller which is mounted in the stage unit to calculate a distance and position between the mobile robot unit and the stage unit based on a signal detected by a robot position sensor connected to the robot controller and variations in a length of the connection line, and calculate a tension to be applied to the connection line.

7. The mobile robot according to claim 1, wherein the stage unit comprises:

a stage body which has the at least one docking module on a top thereof so as to be coupled to fixing protrusions of the mobile robot unit, and the rechargeable battery mounted therein;

at least one stage electromagnet which is arranged on one side of the stage body so as to face the hull;

a sealable external power connection terminal which is installed on the other side of the stage body, and connected to the stage controller; and at least one linear motor which is coupled to the stage body, and is controlled by the stage controller so as to move forward a permanent magnet provided on an end of an operation arm thereof, and attach the permanent magnet to the hull or separate the permanent magnet from the hull.

8. The mobile robot according to claim 7, wherein the stage unit comprises:

a drum which is rotatably installed on the stage body to have the connection line wound thereon;

a drum motor installed on the stage body to forwardly or reversely rotate the drum so as to wind or unwind the connection line;

a power transmitting unit which is installed between the drum motor and the drum to transmit power of the drum motor to the drum;

an encoder which is installed on one end of a drum shaft of the drum to measure the number of revolutions of the drum; and a line tensioner which is installed on a drum frame for supporting the drum, so as to apply a tension to the connection line.

\* \* \* \* \*

UNITED STATES PATENT AND TRADEMARK OFFICE
CERTIFICATE OF CORRECTION

PATENT NO. : 9,662,782 B2  
APPLICATION NO. : 14/670278  
DATED : May 30, 2017  
INVENTOR(S) : Nam et al.

Page 1 of 1

It is certified that error appears in the above-identified patent and that said Letters Patent is hereby corrected as shown below:

On the Title Page

At item (72) in the list of inventors, please correct "Teak-kun Nam" to read --Taek-kun Nam--.

Signed and Sealed this
Fourteenth Day of May, 2019

Andrei Iancu
*Director of the United States Patent and Trademark Office*